United States Patent [19]

Johnstone

[11] 4,017,281
[45] Apr. 12, 1977

[54] INDUSTRIAL VACUUM LOADER WITH DUST REMOVAL MEANS FOR BAG HOUSE FILTRATION SYSTEM

[76] Inventor: Duncan Johnstone, P.O. Box 574, Lannon, Wis. 53046

[22] Filed: Oct. 2, 1975

[21] Appl. No.: 618,945

[52] U.S. Cl. .............................. 55/334; 55/341 R; 55/385 B; 55/431; 15/340; 15/352

[51] Int. Cl.² ........................................ B01D 50/00

[58] Field of Search ........ 55/314, 319, 334, 341 R, 55/385 B, 425, 426, 427, 431, 432, 433, 466, DIG. 3; 15/348, 352, 353, 340; 302/57, 59, 62

[56] References Cited

UNITED STATES PATENTS

| 2,937,713 | 5/1960 | Stephenson et al. | 55/426 |
|---|---|---|---|
| 3,392,513 | 7/1968 | Hedin | 55/425 |
| 3,473,300 | 10/1969 | Wilm et al. | 55/431 |
| 3,541,631 | 11/1970 | Kluge et al. | 55/432 |
| 3,651,621 | 3/1972 | Davis | 55/319 |
| 3,885,932 | 5/1975 | Moore, Jr. et al. | 55/314 |
| 3,926,596 | 12/1975 | Coleman | 55/433 |

FOREIGN PATENTS OR APPLICATIONS

| 1,001,465 | 1/1957 | Germany | 55/DIG. 3 |
|---|---|---|---|
| 782,558 | 9/1957 | United Kingdom | 55/341 R |

Primary Examiner—Frank W. Lutter
Assistant Examiner—David L. Lacey
Attorney, Agent, or Firm—James E. Nilles

[57] ABSTRACT

An industrial vacuum loader comprises an enclosed hopper into which particulate matter is drawn through a loading hose. The hopper is connected by a suction hose to the lower intake port of a bag house and the upper outlet port of the bag house is connected by a transformation hose to the suction port of an engine-driven positive displacement rotary blower. The bag house comprises an upper chamber containing filtration bags and a lower dust collection chamber in which dust filtered from dust-laden air passing through the bag house is collected. Means are provided to remove the collected dust from the dust collection chamber before the accumulation thereof adversely effects filtration capacity and comprises gates for selectively closing off the dust collection chamber from the upper chamber at a location below the inlet port of the bag house so as to isolate the dust collection chamber from the blower and enable build-up of substantially atmospheric rather than low pressure in the dust collection chamber and a dust duct for connecting the closed-off dust collection chamber to the enclosed hopper whereby the collected dust is sucked into the hopper as a result of the pressure differential between the dust collection chamber and the hopper.

6 Claims, 5 Drawing Figures

INDUSTRIAL VACUUM LOADER WITH DUST REMOVAL MEANS FOR BAG HOUSE FILTRATION SYSTEM

BACKGROUND OF THE INVENTION

1. Field of Use

This invention relates generally to mobile and stationary industrial vacuum loaders having bag house filtration systems for the collection of dust escaping from material being sucked into the hopper and, in particular, to means for removing collected dust from the bag house and returning it to the hopper.

2. Description of the Prior Art

Industrial vacuum loaders are used to load particulate or granular material from piles, bins, trucks, railroad cars, ship holds, or the like into a hopper for transport or conveyance to another location. Such loaders may be mobile and mounted on railroad cars, truck bodies or other vehicles. Or, such loaders may be staionarily mounted in a fixed location in an industrial plant. Some such industrial vacuum loaders employ a large enclosed hopper into which the particulate or granular material such as iron ore, cement, bauxite, alumina or the like is drawn through a flexible laoding hose attached to the hopper inlet and means are provided to unload the hopper as by dumping or tilting. Low pressure for suction purposes is maintained in the hopper by means of a relatively large engine-driven positive displacement rotary blower which has its suction port connected to an air outlet port on the hopper and has its pressure port connected to atmosphere. To prevent dust, fines or other extremely small air-suspended particles in the material being loaded from being drawn from the hopper and through the blower for discharge to the atmosphere, dust filtration means in the form of an enclosed bag house is connected between the air outlet port in the hopper and the suction port on the blower. The bag house comprises an upper chamber wherein a filter in the form of a plurality of porous bags is disposed and a lower dust collection chamber located below the bags in which the filtered dust collects and from which the dust can be removed as required through a cleanout port. Dust-laden air drawn from an air outlet port in the hopper is introduced into the bag house through an intake port located near the lower ends of the bags, passes in a tortuous path between and through the porous bags, and exits in dust free condition from the bag house though an outlet port located near the upper ends of the bags.

An inherent problem with such vacuum loaders is that, when loading the hopper with dry or fine materials, the bag house can become completely filled up with collected dust before the hopper fills up. This interferes with proper operation of the loader and requires time-consuming and costly shutdown of the loader and cleanout of the bag house through the cleanout port though the hopper still has unused capacity. The larger the capacity of the hopper, the more chance there is for this to happen. Attempts have been made to alleviate this problem by providing small hoppers or chutes for the dust collection chamber at the bottom of the bag house and installing air locks and a small positive displacement blower to pneumatically blow the collected dust from the aforesaid small hoppers or chutes back into the hopper through a conveying hose. However, the pneumatic conveying hose in such an arrangement is, of necessity, relatively small in diameter to match the air-handling capacity of the small blower and plugs easily with dust of most materials thereby introducing further cleanout problems.

SUMMARY OF THE PRESENT INVENTION

An industrial vacuum loader in accordance with the invention comprises an enclosed hopper into which particulate matter is drawn through a loading hose connected to a material intake port on the hopper. The hopper comprises an air outlet port which is connected by a suction hose to the lower intake port of a bag house and the upper outlet port of the bag house is connected by a transformation hose to the suction port of an engine-driven positive displacement rotary blower. The bag house comprises an upper chamber containing filtration bags and a lower dust collection chamber in which dust filtered from dust-laden air passing through the bag house is collected. Means are provided to remove the collected dust from the dust collection chamber before the accumulation thereof adversely effects filtration capacity and comprises means in the form of gates or the like for selectively closing off or sealing the dust collection chamber from the upper chamber at a location below the inlet port of the bag house so as to isolate the dust collection chamber from the blower and enable build-up of substantially atmospheric rather than low pressure in the dust collection chamber and further comprises a dust duct means for connecting the closed-off dust collection chamber to the enclosed hopper whereby the collected dust is sucked into the hopper.

In one embodiment of the invention the dust duct means comprise the loading hose and means for releasably connecting the pickup end thereof to an opening in the dust collection chamber. In another embodiment of the invention, the dust duct means comprise a pipe, hose or conduit (hereinafter called a dust conduit) separate from the loading hose and connected between the dust collection chamber and a dust collection port in the hopper. In the said other embodiment, dust conduit valve means are provided for selectively opening and closing the dust conduit and such dust conduit valve means may be manually or automatically operated as by hydraulic, pneumatic, or electric actuators. In the said other embodiment means are also provided to close off the loading hose to enable proper pressure conditions to exist in the hopper for suction of the collected dust from the dust chamber.

The sealing means for selectively closing off or sealing the upper chamber and the air intake port of the bag house from the lower dust collection chamber may, for example, take the form of single or multisectioned shutters, louvers, doors, or gates mounted for pivotal or sliding movement between open and closed position by means of manual, hydraulic, pneumatic or electric actuators or some combination thereof.

Control means are provided in connection with the said other embodiment employing the permanently connected dust conduit and the automatically controlled dust conduit valve to synchronize operation of the sealing means and dust conduit valve.

An industrial vacuum loader in accordance with the present invention offers several advantages over the prior art. For example, collected dust is removed from the bag house by means of the positive displacement rotary blower and additional auxiliary dust blowers and power sources therefor are not required. Also, the relatively large diameter of the loading hose avoids the clogging problem encountered with smaller diameter hoses in some prior art systems using auxiliary dust blowers. Furthermore, systems in accordance with the invention are relatively economical and easy to use and service. Other objects and advantages of the invention will hereinafter appear.

DRAWINGS

DESCRIPTION OF PREFERRED EMBODIMENTS

Figure 1:
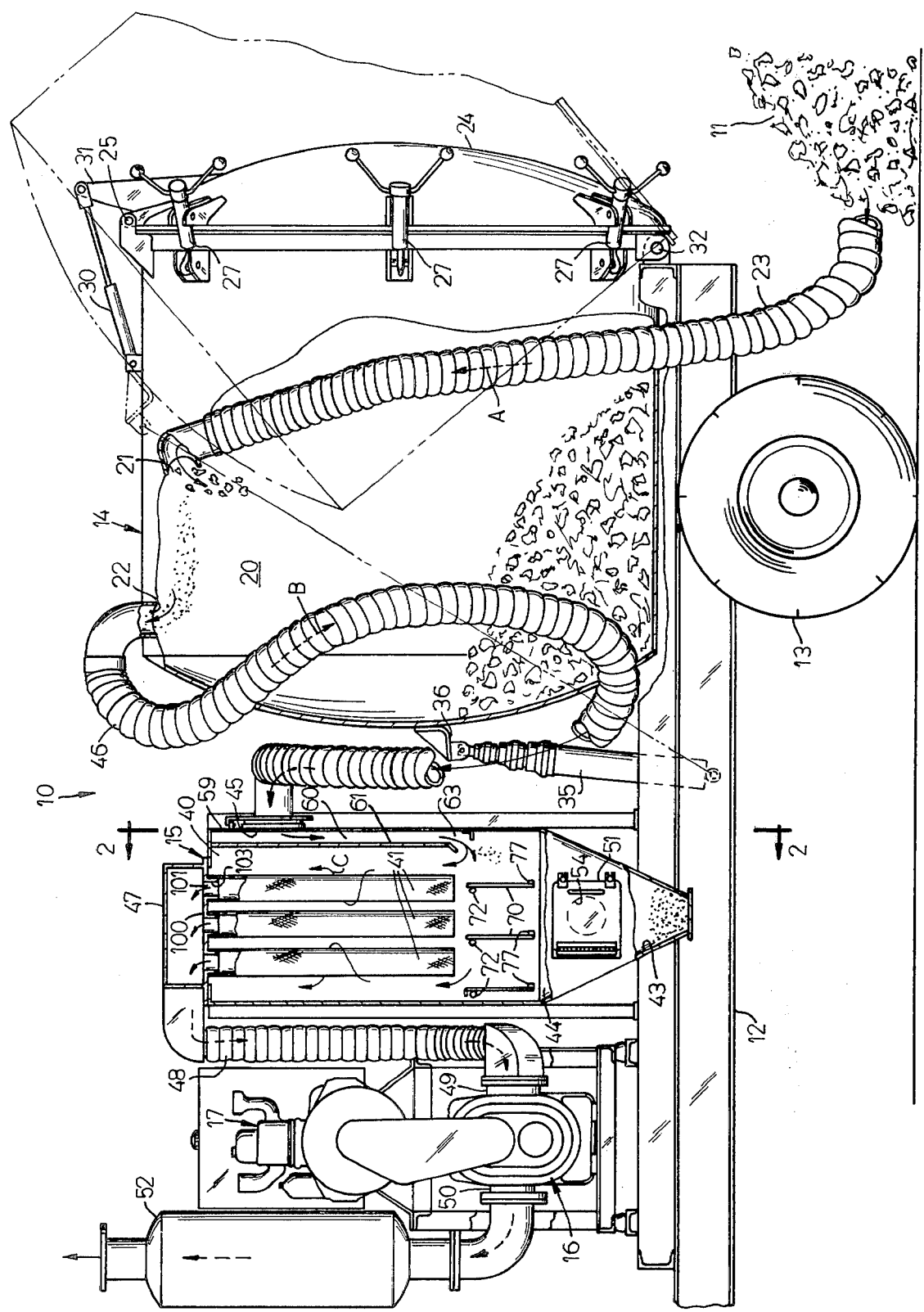
FIG. 1 is a side elevation view, partly in section, of a portion of a mobile industrial vacuum loader in accordance with the invention and showing the loading hose connected for material pickup and the bag house dust collection chamber sealing means in open condition.

Referring to FIG. 1, the numeral 10 designates one embodiment of an industrial vacuum loader in accordance with the present invention. Loader 10 is a mobile unit adapted to vacuum load dust-laden particulate material, for example, from a pile 11 and to transport and dump the material at a desired location. Loader 10 is mounted on a truck chassis 12 having driven wheels 13 and generally comprises an enclosed hopper 14, an enclosed bag house or housing 15, a positive displacement rotary air blower 16 and a prime mover, such as an internal combustion engine 17 for driving the blower.

Hopper 14 is shown as generally cylindrical but could take any shape and comprises an interior chamber 20 in which material is deposited and is provided with a material intake port 21 and an air outlet port 22. A flexible material loading hose 23 has one end connected to port 21 and has its free end available to receive material from pile 11. Hopper 14 is provided with a rear door 24 which is pivotally connected thereto by an upper hinge pin 25 and swingable between open and closed position by means of a hydraulic ram 30 connected between a lever arm 31 on the door and the top of the hopper. Releasable dogs 27 are provided for securing door 24 in closed position. Hopper 14 is mounted for pivotal movement on chassis 12 by means of pivot pins 32 and can be tilted between the loading position shown in FIG. 1 and the dump position shown in phantom by means of a hydraulic lift cylinder 35 connected between chassis 12 and a bracket 36 on the forward end of hopper 14.

Figure 2:
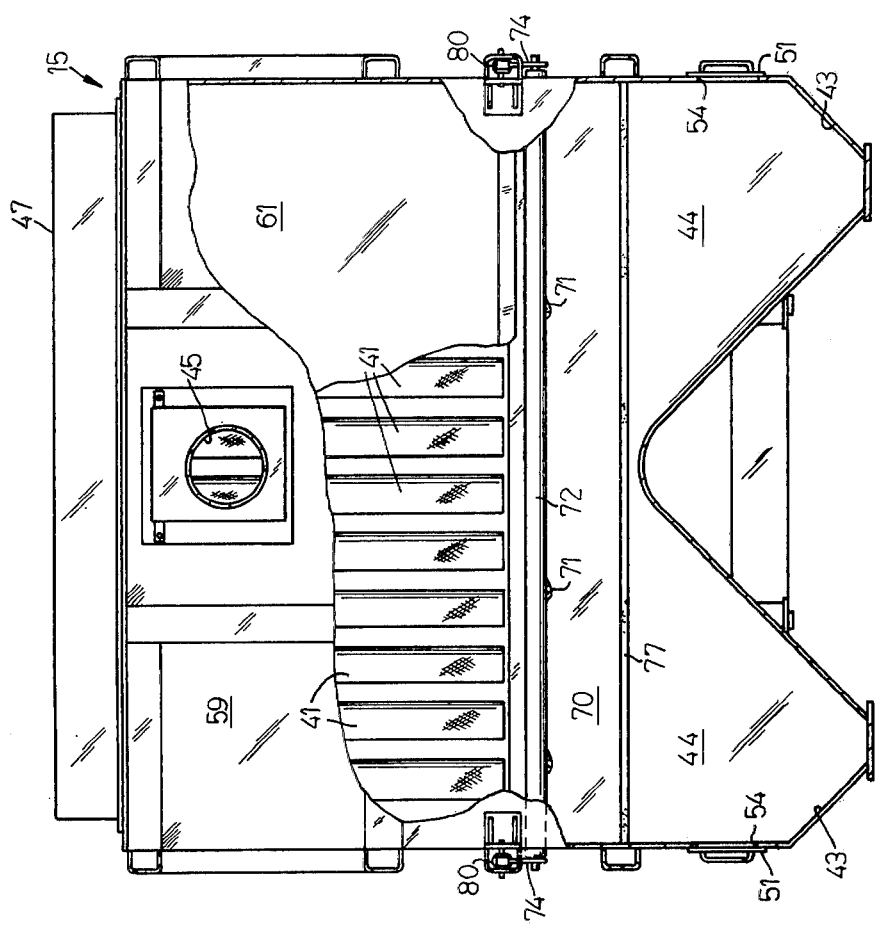
FIG. 2 is a cross section view of the bag house taken on line II—II of FIG. 1.

As FIGS. 1 and 2 show, bag house 15 comprises an upper chamber 40 wherein dust filtering means in the form of a plurality of porous filter bags 41 are mounted and and two dust collection chambers 43 which are partially defined by dust bins 44 at the lower end of the bag house. Dust bin 44 is provided with a hingedly mounted bag house cleanout door 51 which opens to afford access to chamber 43 for manual removal of collected dust. Dust bin 44 is provided, behind door 51, with a port 54 to facilitate connection of the free end of loading hose 23 to the chamber 43 to remove dust therefrom, as hereinafter explained. Bag house 15 is provided with an air intake port 45 which is connected by means of a flexible suction hose 46 to air outlet port 22 of hopper 14. Bag house 15 is also provided with an air outlet port 47 which is connected by means of a flexible transformation hose 48 to an air suction port 49 on blower 16. Blower 16 also comprises an air discharge port 50 which is connected to atmosphere through a noise-reducing muffler 52.

As FIG. 1 shows, air intake port 45 of bag house 15 is located at the upper rear wall 59 of the bag house and connects to a passage 60 defined by a baffle plate 61 in upper chamber 40 which is parallel to and spaced from the inside of rear wall 59. Baffle plate 61 has its upper and side edges connected in sealed relationship to top and opposite side walls of bag house 15. The passage 60 has an opening 63 at its bottom end (i.e., at the lower edge of baffle plate 61) and communicates with upper chamber 40 near the lower end of the latter in the vicinity of the lower ends of the filter bags 41. In effect, then, air entering air intake port 45 of the bag house 15 enters chamber 40 at opening 63. Air outlet port 47 of bag house 15 is located at the upper end of the bag house above the filter bags 41. The apparatus thus far described operates in the following manner. When engine 17 is operating to drive blower 16, a low pressure air condition exists in bag house 15 and hopper 14, and the hose 23 is employed to suck or draw particulate material from pile 11 through loading hose 23 and through port 22 for deposit within the hopper 14, as shown by arrow A in FIG. 1. If the particulate material being drawn into hopper 14 is highly pulverized and dry, it contains fines or dust which is not deposited by gravity in hopper 14, as the bulk of the material would be, but remains in suspension in the air stream within hopper 14 and is drawn, along with incoming air, through port 22 of hopper 14, through suction hose 46, through air intake port 45, through passage 60 and through opening 63 into the interior of bag house 15, as shown by arrow B in FIG. 1. Dust-laden air drawn into bag house 15 through opening 63 is drawn across and through the porous filter bags 41 in a tortuous path, as indicated by the arrow C in FIG. 1 and in the process, the dust particles or fines are filtered by the bags and deposited under the force of gravity in the lower dust collection chamber of the bag house 15. Dust-free air then flows through port 47 of bag house 15, through transformation hose 48, through suction port 49 of blower 16, through the blower 16 and out the discharge port 50 of blower 16 and through muffler 52 to atmosphere. Under some conditions, depending on the type of material being loaded, the dust in bag house 15 may accumulate at such a rapid rate that the chambers 40 and 43 of bag house 15 become filled before hopper 14 is completely filled with material and it becomes necessary to stop the loading process so that the dust collecting chamber 43 may be emptied.

However, in accordance with the present invention, means are provided in loader 10 to remove the collected dust in lower dust collecting chamber in bag house 15 before the accumulation thereof effect filtration capacity. Such means comprise means for closing off the lower dust collecting chamber 43 from the upper chamber 40 of bag house 15 at a location below both ports 45 and 47 of the bag house so as to alter the air pressure conditions between the upper chamber 40 and the lower chamber 43 so that the air pressure in lower dust collecting chamber 43 rises above the relatively low system pressure and increases toward atmospheric pressure, as compared to the relatively low system pressure existing in upper chamber 40 and in hopper 15 as a result of air being drawn therethrough by blower 16. In further accordance with the invention, duct means are provided for connecting the lower dust collecting chamber 43 to the hopper 14 so that the dust in chamber 43 is drawn into the hopper.

Figure 3:
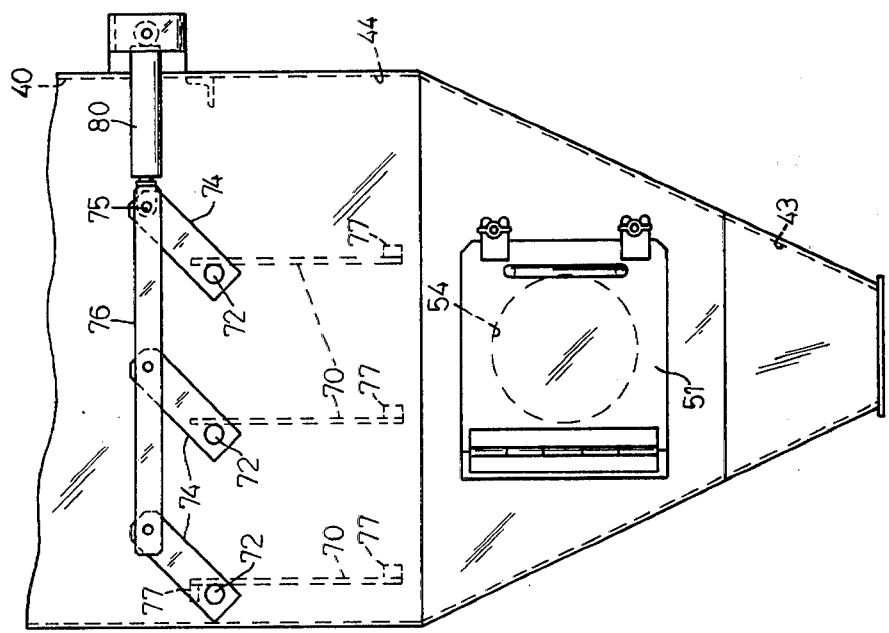
FIG. 3 is an enlarged elevation view of the dust collection chamber sealing means shown in FIGS. 1 and 2.

The means for closing off chamber 40 from chamber 43 shown in loader 10 comprises a plurality of gates 70 which are located between the chambers, i.e., below the bags 41 and below the openings 45 and 47, and are selectively swingable between a fully open position shown in FIG. 1 and a fully closed position shown in FIG. 4. Each gate 70 takes the form of a solid rectangular plate which is rigidly secured as by welding at 71 to a shaft 72 which has its ends supported and journalled for rotation on the side walls of bag house 15. Each shaft 72 is rigidly connected to one end of a lever arm 74 and the other end of each lever arm 74 is pivotally connected as by a pin 75 to a horizontal draw bar 76 which is mounted for slideable movement by means of an actuator 80. Movement of draw bar 76 to the right, with reference to FIG. 1, causes the gates 70 to assume the fully open position. Movement of of the draw bar 76 to the left, with reference to FIG. 1, causes the gates 70 to assume the fully closed position shown in FIG. 4. As FIG. 3 shows, each gate 70 is provided along the upper side of its free edge with a resilient sealing member, such as a rubber strip 77, which serves to seal the space between adjacent gates 70 when the latter are swung to closed position thereby ensuring that a relatively air-tight seal exists between upper chamber 40 and lower chamber 43. The leftmost gate in FIG. 1 has two strips 77.

Figure 4:
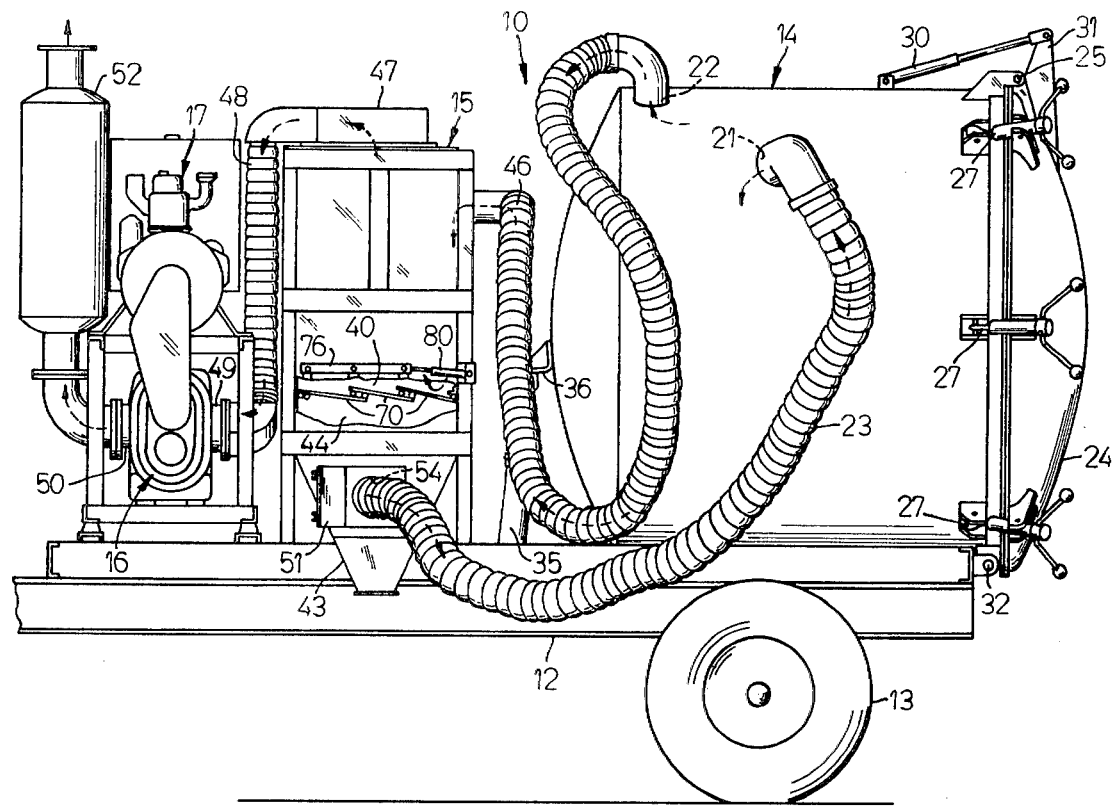
FIG. 4 is a view similar to FIG. 1 but in reduced scale and showing the loading hose connected to the dust collection chamber for dust removal and the dust collection chamber sealing means closed.

In the embodiment of the invention shown in FIGS. 1 and 4, the duct means for connecting dust collecting chamber 43 and hopper 14 comprise the aforementioned port 54 which affords access to the interior of the chamber 43 and to which the free end of loading hose 23 can be connected when door 51 opens to expose port 54.

As FIG. 4 shows, dust is removed from chamber 43 by effecting closure of the gates 70 and by connecting the free end of loading hose 23 to port 54 and operating the blower 16 so that suction is created within hopper 14 and the dust is drawn through loading hose 23 into hopper 14 wherein the majority of the dust settles out by gravity.

Figure 5:
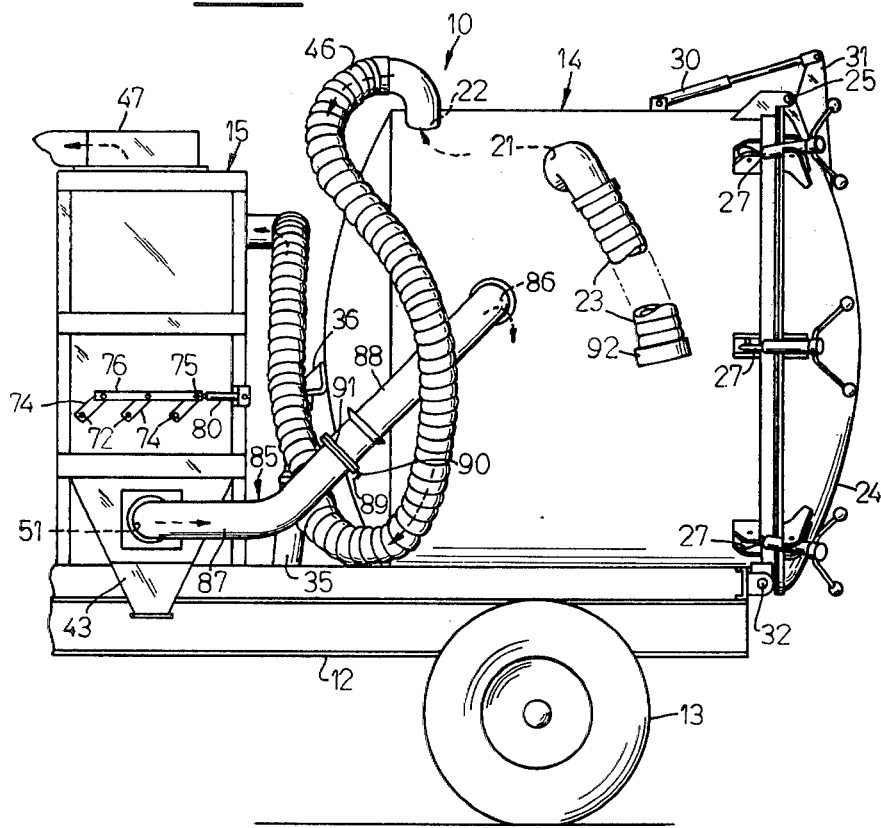
FIG. 5 is a view similar to FIG. 1 but showing another embodiment of the invention employing a dust conduit separate from the loading hose.

In the embodiment of the invention shown in FIG. 5, the conduit means for selectively connecting dust collecting chamber 43 of bag house 15 to hopper 14 comprises a dust duct 85 which is permanently connected between the dust collecting chamber 43 and a dust entry port 86 in hopper 14. The dust duct 85 is provided with valve means 89 which may be selectively opened or closed as required. In the embodiment shown in FIG. 5, the dust duct 85 is formed of two separable sections 87 and 88 to enable the dust duct 85 to separate when hopper 14 is tilted for dumping purposes. The valve means 89 may take the form of a removable plate 90 which is adapted to be slideably inserted beneath clamps 91 at the open end of section 87 of dust duct 85 to close the dust duct during loading operation. In the embodiment shown in FIG. 5, a dust removal operation is carried out by closing the gates 70 to create the afore described pressure differential between upper chamber 40 and lower dust collecting chamber 43 in bag house 15, closing the end of loading hose 23 by means of a removable cap 92 so as to maintain system low pressure in hopper 14 at a level low enough to exert a good drawing or suction action on the dust in dust collection chamber 43, removing the plate 90 from dust duct 85 so as to complete the communication between dust collecting chamber 43 and the interior of hopper 14, and operating blower 16 so as to create a low pressure condition within hopper 14 whereby the dust from chamber 22 is drawn into hopper 14.

In the embodiments of the invention disclosed herein, the hopper 14 is custom fabricated to suit particular requirements and could have a volumetric capacity of anywhere from 6 to 20 cubic yards. The lift cylinder 35 for raising and lowering the hopper 14 is a conventional commercially available telescopic hoist cylinder. Similarly, the hydraulic ram 30 is a conventional commercially available hydraulic cylinder. The prime mover could be a gasoline engine, a diesel engine, or an electric motor. In typical commercial embodiments, a Detroit Diesel engine in the 160 to 238 horsepower class, or a Continental Model F227 gasoline engine would be suitable. Blower 16 could, for example, take the form of a series 4500 rotary blower of the type shown in Bulletin RML published by the Fuller Company of 2966 East Victoria Street, Compton, Calif., which has, for example, an air handling capacity of anywhere from about 1,000 to 4,000 cubic feet per minute depending on the particular size selected. The loading hose 23, the suction hose 46, the transformation hose 48, and the dust duct 85 each have a diameter on the order of about 8 inches.

The bag house 15 may employ dust filtering means of a type available from the D. P. Way Corporation of Milwaukee, Wisc. Such a filtering system comprises, as FIG. 1 shows, a baffle plate 100 having a plurality of perforations 101 therein with a hollow cylindrical perforated bag supporting member 103 extending through each hole 101. Each bag supporting member 103 is adapted to have a hollow cylindrical bag such as 41 slipped thereover. Dust-laden air passes through the bag 41 from the exterior thereof to the interior of the bag supporting member 103 whereby dust collects on the exterior of the bag 41 and dust-free air passes upwardly through the bag supporting member and through its associated hole to port 47 which takes the form of a hood or manifold as shown in FIGS. 1 and 2.

In the embodiments of the invention disclosed herein, and as FIG. 2 best shows, the bag house 15 is preferably constructed so as to be provided with two dust collection chambers 43, one on each lateral side of the bag house. Each dust collecting chamber 43 is provided with its own cleanout port 54 and cleanout door 51. It is to be understood that each dust collection chamber 43 is cleaned out separately by means of the loading hose 23 shown in FIG. 1. Furthermore, in the embodiment of the invention shown in FIG. 5, two dust ducts 85 would be provided, one for each dust collection chamber 43.

I claim:
1. An industrial vacuum loader for handling dust-laden particulate material comprising;
   a hopper having a material inlet port and an air outlet port;
   a housing having an air inlet port connected to said air outlet port of said hopper and comprising a first chamber containing filtering means and a dust collecting chamber below said filtering means, said dust collecting chamber being communicable with said first chamber;

a blower connected to said housing to maintain system air pressure below atmospheric pressure in said hopper and in said housing whereby material can be drawn into said hopper and whereby dust-laden air from said hopper is drawn through said filtering means;

means for isolating said dust collecting chamber from said first chamber so that air pressure in said dust collecting chamber increases above said system air pressure in said hopper;

and conduit means for connecting said dust collecting chamber to said hopper while said dust collecting chamber is isolated from said first chamber so that dust is drawn from said dust collecting chamber into said hopper.

2. A loader according to claim 1 said conduit means includes a loading hose having one end connected to said material inlet port and a free end, and said conduit means further comprises a port affording access to said dust collecting chamber and adapted for connection to said free end of said loading hose.

3. A loader according to claim 1 including a loading hose having one end connected to said material inlet port and a free end, and wherein said conduit means comprises a dust duct connected between said dust collecting chamber and said hopper, valve means for opening or closing said dust duct, and means for closing said free end.

4. An industrial vacuum loader for handling dust-laden particulate material comprising;

a hopper having a material inlet port and an air outlet port;

a filter housing containing filtering means and a dust collecting chamber below said filtering means, said filter housing comprising an air inlet port connected to said air outlet port on said hopper and further comprising an air outlet port, said dust collecting chamber having a closable access port;

a blower having a suction port connected to said air outlet port of said filter housing to maintain system air pressure below atmospheric pressure in said hopper and in said filter housing whereby material can be drawn into said hopper through said material inlet port and whereby dust-laden air from said hopper is drawn through said filtering means;

means for isolating said dust collecting chamber from said air inlet port and said air outlet port of said filter housing so that air pressure in said dust collecting chamber increases above said system air pressure in said hopper;

and conduit means for connecting said access port of said dust collecting chamber to said hopper while said dust collecting chamber is isolated so that dust is drawn from said dust collecting chamber into said hopper.

5. A loader according to claim 4 wherein said conduit means comprises a loading hose having one end connected to said material inlet port of said hopper and having its other end detachably connected to said access port.

6. A loader according to claim 4 wherein said hopper further comprises a dust collection port, wherein said conduit means comprises a dust duct connected between said access port and said dust collection port in said hopper.

* * * * *